US010027062B2

(12) United States Patent
Maeda

(10) Patent No.: US 10,027,062 B2
(45) Date of Patent: Jul. 17, 2018

(54) SIGNAL TRANSMISSION CABLE

(71) Applicant: Sumitomo Electric Industries, Ltd., Osaka-shi (JP)

(72) Inventor: Yasuhiro Maeda, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/606,340

(22) Filed: May 26, 2017

(65) Prior Publication Data

US 2017/0338598 A1 Nov. 23, 2017

Related U.S. Application Data

(63) Continuation of application No. 14/805,028, filed on Jul. 21, 2015, now Pat. No. 9,692,182.

(30) Foreign Application Priority Data

Jul. 22, 2014 (JP) ................................ 2014-148917

(51) Int. Cl.
*H02G 15/04* (2006.01)
*H01R 13/6467* (2011.01)
*H01R 24/22* (2011.01)

(52) U.S. Cl.
CPC ......... *H01R 13/6467* (2013.01); *H01R 24/22* (2013.01)

(58) Field of Classification Search
CPC .... H01R 9/08; H01R 23/005; H01R 13/6461; H01R 13/6658; H01R 9/032; H01R 13/6467; H01R 24/22
USPC ....... 174/74 R, 79, 88 R; 439/494, 493, 629, 439/498, 63
See application file for complete search history.

(56) References Cited

U.S. PATENT DOCUMENTS

| | | | | |
|---|---|---|---|---|
| 5,523,528 A * | 6/1996 | Bese | H01B 7/0233 | 174/109 |
| 6,336,827 B1 * | 1/2002 | Akama | H01R 12/62 | 174/261 |
| 7,607,948 B1 * | 10/2009 | Lee | H01R 9/032 | 439/620.22 |
| 2009/0306475 A1 * | 12/2009 | Yamamoto | A61B 1/05 | 600/110 |
| 2010/0055973 A1 * | 3/2010 | Yang | H01R 13/6658 | 439/490 |

(Continued)

FOREIGN PATENT DOCUMENTS

| | | |
|---|---|---|
| CN | 102668267 A | 9/2012 |
| WO | 2011056491 A1 | 5/2011 |

*Primary Examiner* — Steven T Sawyer
(74) *Attorney, Agent, or Firm* — Venable LLP; Michael A. Satori; Laura G. Remus

(57) ABSTRACT

A signal transmission cable of the present invention comprises a terminal part electrically connectable to an external device, and a cable including metal wires of eight or more channels that are electrically connectable to the terminal part, the terminal part has a substrate including a plurality of connection parts that are electrically connectable to the external device and connected respectively to the metal wires of the individual channels included in the cable, and the metal wires of the mutually different channels that are adjacently connected at the plurality of connection parts are arranged so as not to be adjacent to each other inside the cable.

3 Claims, 11 Drawing Sheets

(56) References Cited

U.S. PATENT DOCUMENTS

2012/0269522 A1 * 10/2012 Kagaya .................. H01P 3/026
398/183

* cited by examiner

SIGNAL TRANSMISSION CABLE

CROSS-REFERENCE TO RELATED APPLICATIONS

This application is a Continuation of U.S. patent application Ser. No. 14/805,028, filed Jul. 21, 2015, which claims the benefit of Japanese Patent Application No. 2014-148917, filed Jul. 22, 2014.

BACKGROUND OF THE INVENTION

1. Filed of the Invention

The present invention relates to a signal transmission cable.

2. Background Arts

Japanese Patent No. 4248042 discloses a technology of appropriately arranging contacts (connection parts) on a substrate in order to suppress Near End Crosstalk (NEXT) that occurs between transmission signals and reception signals and Far End Crosstalk (FEXT) that occurs between signals in the same direction. Japanese Patent Application Laid-Open No. 2004-87189 discloses a twinax cable for differential transmission as a signal transmission cable.

Crosstalk tends to occur between metal wires relating to different and adjacent channels of a cable terminal part on a substrate (hereinafter, described as a terminal part) or inside a cable. In the case that the metal wires relating to different channels are adjacent at the terminal part of the substrate of and inside the cable, influence of the crosstalk increases. Here, an arrangement of the metal wires inside the cable is generally determined in consideration of mountability to the substrate. The metal wires that are adjacent to each other on the substrate are often adjacent inside the cable, too. Thus, there is a case of being strongly influenced by the crosstalk.

SUMMARY OF THE INVENTION

One aspect of the present invention relates to a signal transmission cable. The signal transmission cable comprises a terminal part attachable to and detachable from an external device, and a cable fixed to the terminal part at its end. The cable includes a plurality of metal wires configuring signal transmission lines of eight or more channels. The terminal part includes a substrate that includes a plurality of connection parts that are electrically connectable to the external device and connected respectively to the metal wires. The metal wires that are adjacently connected at the plurality of connection parts and configure mutually different signal transmission lines are arranged so as not to be adjacent to each other inside the cable.

Further, a signal transmission cable relating to another aspect of the present invention comprises a terminal part attachable to and detachable from an external device and a cable fixed to the terminal part at its end. The cable includes a plurality of metal wires configuring signal transmission lines of eight or more channels. The terminal part includes a substrate that includes a plurality of connection parts that are electrically connectable to the external device, and a signal processing circuit having a plurality of first terminals connected respectively to the plurality of connection parts, and a plurality of second terminals connected respectively to the metal wires. The metal wires that are adjacently connected at the plurality of second terminals and configure mutually different signal transmission lines are arranged so as not to be adjacent to each other inside the cable.

Further, a signal transmission cable relating to another aspect of the present invention comprises a terminal part attachable to and detachable from an external device and a cable fixed to the terminal part. The cable includes a plurality of metal wires configuring signal transmission lines of eight or more channels. The metal wires include outer metal wires arranged along an periphery of the cable, and inner metal wires arranged on an inner of the outer metal wire. The metal wires that are the outer metal wires and transmit signals in the same direction are arranged so as not to be adjacent to each other.

DESCRIPTION OF EMBODIMENTS

Figure 1:
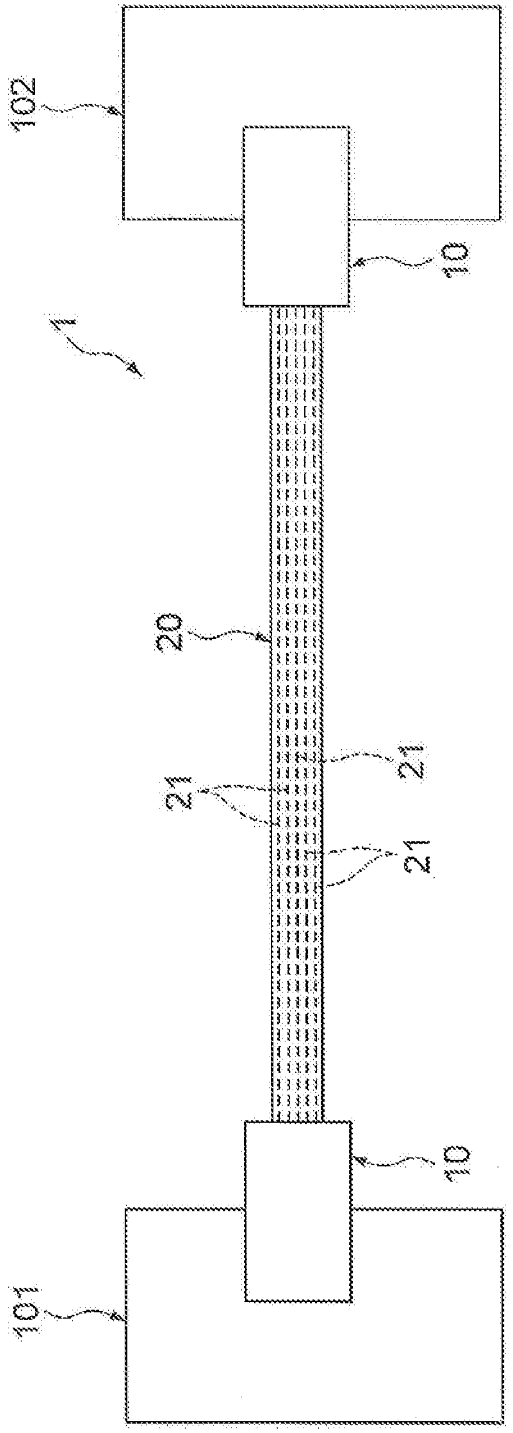
FIG. 1 is a diagram illustrating a configuration of a signal transmission cable relating to a first embodiment.

Description of Embodiments of the Present Invention (1) One aspect of the present invention relates to a signal transmission cable. The signal transmission cable comprises a terminal part attachable to and detachable from an external device, and a cable fixed to the terminal part at its end. The cable includes a plurality of metal wires configuring signal transmission lines of eight or more channels. The terminal part includes a substrate that includes a plurality of connection parts that are electrically connectable to the external device and connected respectively to the metal wires. The metal wires that are adjacently connected at the plurality of connection parts and configure mutually different signal transmission lines are arranged so as not to be adjacent to each other inside the cable. Thus, the metal wires configuring the different signal transmission lines are prevented from being adjacent both at the connection part and inside the cable. Therefore, influence of crosstalk between the different channels can be reduced.

(2) A signal transmission cable relating to another aspect of the present invention comprises a terminal part attachable to and detachable from an external device and a cable fixed to the terminal part at its end. The cable includes a plurality of metal wires configuring signal transmission lines of eight or more channels. The terminal part includes a substrate that includes a plurality of connection parts that are electrically connectable to the external device, and a signal processing circuit having a plurality of first terminals connected respectively to the plurality of connection parts, and a plurality of second terminals connected respectively to the metal wires. The metal wires that are adjacently connected at the plurality of second terminals and configure mutually different signal transmission lines are arranged so as not to be adjacent to each other inside the cable. Thus, the metal wires configuring the different signal transmission lines are prevented from being adjacent both on the substrate (second terminals) and inside the cable. Therefore, the influence of the crosstalk between the different channels can be reduced also in the signal transmission cable including the signal processing circuit.

(3) In the above-described signal transmission cable, the cable may include outer metal wires arranged along an periphery of the cable, and inner metal wires arranged on an inner of the outer metal wire, as the metal wires. Part of combinations of the metal wires that are adjacently connected at the plurality of connection parts and configure mutually different signal transmission lines may be the combination of the outer metal wires with each other, and the metal wires relating to the combination may be arranged on the same straight line passing through the center of the cable in the cross section of the cable perpendicular to the axis of the cable. Thus, the metal wires that are adjacently connected at the connection parts and configure the mutually different signal transmission lines can be arranged in a more separated positional relation, and the influence of the crosstalk can be more effectively reduced.

(4) In the above-described signal transmission cable, the cable may include outer metal wires arranged along an periphery of the cable, and inner metal wires arranged on an inner of the outer metal wire, as the metal wires. Part of combinations of the metal wires that are adjacently connected at the plurality of second terminals and configure mutually different signal transmission lines may be the combination of the outer metal wires with each other. The metal wires relating to the combination may be arranged on the same straight line passing through the center of the cable in the cross section of the cable perpendicular to the axis of the cable. Thus, the metal wires that are adjacently connected at the second terminals and configure the mutually different signal transmission lines can be arranged in a more separated positional relation, and the influence of the crosstalk can be more effectively reduced.

(5) In the above-described signal transmission cable, the signal processing circuit may transmit or receive differential signals to/from the external device, and may transmit or receive single end signals to/from the metal wires. Since transmission signals or reception signals of the individual channels can be transmitted by one wire, transmission loss due to skew occurrence can be suppressed by using a single wire cable such as a coaxial cable for example.

(6) In the above-described signal transmission cable, the terminal part may have an aligning mold that converts an arrangement of the metal wires inside the cable to an arrangement of the metal wires on the substrate. Thus, the arrangement of the metal wires differently arranged inside the cable and on the substrate can be appropriately converted, and mountability is improved.

(7) A signal transmission cable relating to another aspect of the present invention comprises a terminal part attachable to and detachable from an external device, and a cable fixed to the terminal part at its end. The cable includes a plurality of metal wires configuring signal transmission lines of eight or more channels. The metal wires include outer metal wires arranged along an periphery of the cable, and inner metal wires arranged on an inner of the outer metal wire. The metal wires that are the outer metal wires and transmit signals in the same direction are arranged so as not to be adjacent to each other. While pursuing extensive studies, the present inventors have obtained knowledge that Far End Crosstalk (FEXT) to be a problem between the metal wires relating to signals transmitted in the same direction becomes a problem particularly in the case that the metal wires are adjacent near the periphery of the cable. On one aspect of the present invention, since the metal wires that transmit signals in the same direction are not adjacent to each other on the periphery of the cable, the influence of the FEXT can be reduced.

Details of Embodiments of the Claimed Invention

Specific examples of the signal transmission cable relating to the embodiments of the present invention will be described with reference to the drawings below. The present invention is not limited to these examples and is indicated by the scope of claims, and it is intended to include all modifications within the meanings and scope that are equivalent to the scope of claims. In the following description, the same signs are attached to the same elements in the description of the drawings, and redundant description is omitted.

First Embodiment

FIG. 1 is a diagram illustrating a configuration of a signal transmission cable 1 relating to the first embodiment. As illustrated in FIG. 1, the signal transmission cable 1 of the present embodiment includes two terminal parts 10 and a cable bundle 20 (cable). One terminal part 10 is attached to one end of the cable bundle 20, and the other terminal part 10 is attached to the other end of the cable bundle 20. The cable bundle 20 is formed by bundling a plurality of metal wires 21 that are insulated wires or coaxial cables which transmit signals. Two metal wires 21 form a pair, and two or more pairs of the metal wires 21 are connected to a substrate 13 (details will be described later) of the terminal part 10. Then, a signal transmission line is configured for each pair of the metal wires 21, and digital signals are transmitted by a differential signal transmission system. The cable bundle 20 is formed by bundling the metal wires 21 of four channels each for transmission and reception, that is, the total of eight channels (eight pairs) (details will be described later).

One terminal part 10 can be inserted and removed (attached and detached) to/from an external device 101, and is electrically connected with the external device 101 by being inserted to the external device 101. The other terminal part 10 can be inserted and removed to/from a different external device 102, and is electrically connected with the external device 102 by being inserted to the external device 102.

Figure 2:
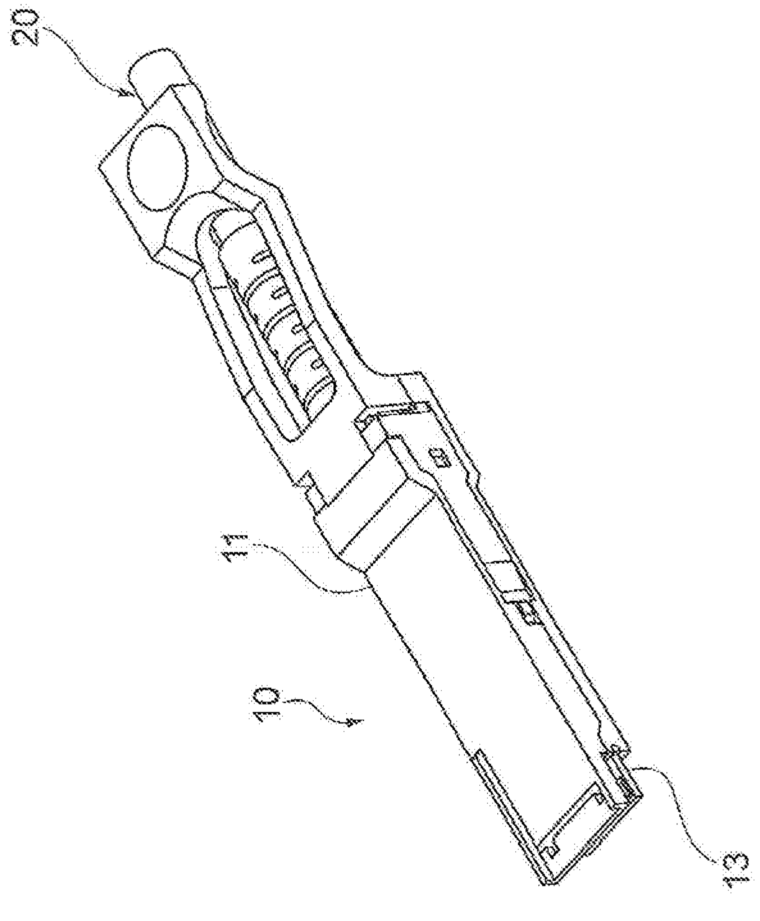
FIG. 2 is a diagram illustrating details of terminal part peripheries.

FIG. 2 is a diagram illustrating details of the periphery of the terminal part 10. As illustrated in FIG. 2, the terminal part 10 includes a metal housing 11. One end of the cable bundle 20 and the substrate 13 are housed inside the metal housing 11, and ends of the metal wires 21 are fixed to the terminal part 10 by soldering the metal wires 21 of the cable bundle 20 to the substrate 13.

Figure 3A:
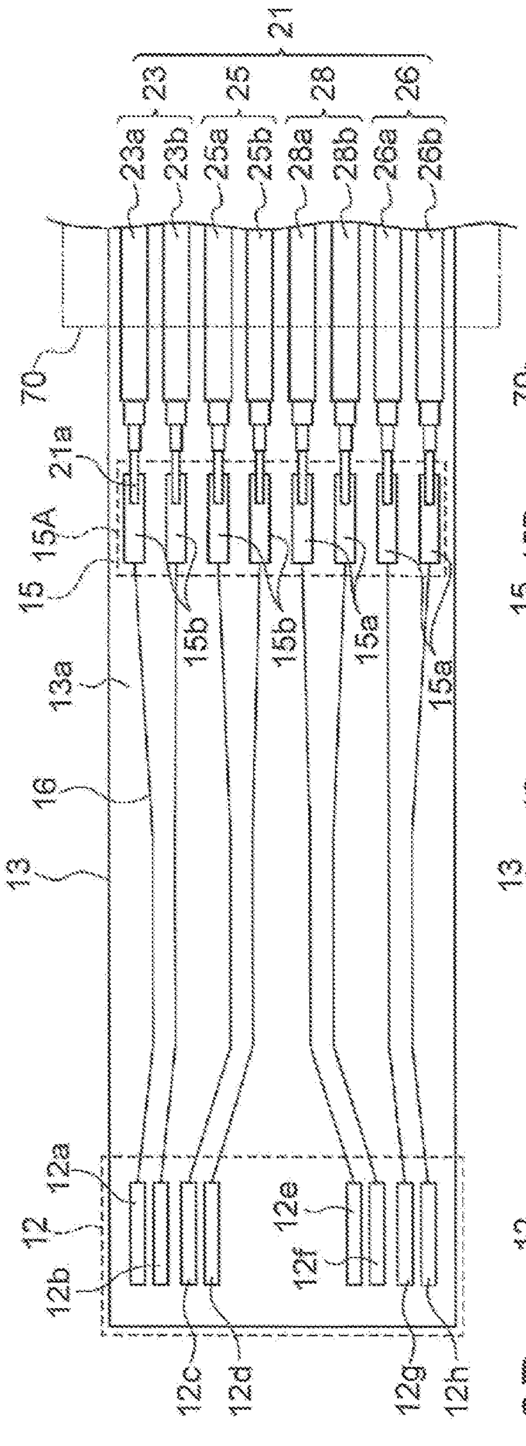
FIG. 3A is a top view viewing a substrate from one plate surface side.
Figure 3B:
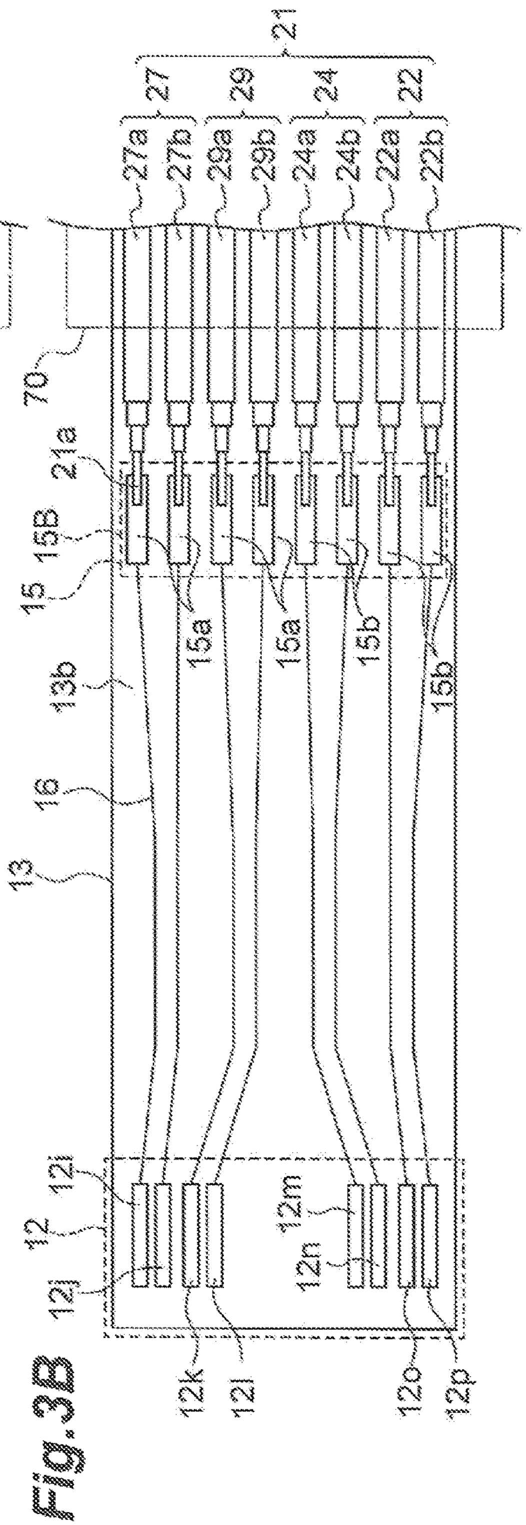
FIG. 3B is a rear view viewing the substrate from the other plate surface side.

FIG. 3A is a top view viewing the substrate 13 from one plate surface side. FIG. 3B is a rear view viewing the substrate 13 from the other plate surface side. As illustrated in FIGS. 3A and 3B, the substrate 13 presents a rectangular shape having a longitudinal direction and a short direction, and includes a dielectric substrate, and conductive wiring patterns formed on one surface 13*a* and on the other surface 13*b* of the dielectric substrate. The substrate 13 has a connection part 12 and a pad group 15, and is electrically connectable to the external devices 101 and 102 and the metal wires 21.

The connection part 12 configures an electrical interface with the external devices 101 and 102 (see FIG. 1 and FIG. 2). The connection part 12 includes a plurality of terminals 12*a*-12*p* (a plurality of connection parts) provided on one surface 13*a* and the other surface 13*b*. The plurality of terminals 12*a*-12*p* are provided corresponding to each of the metal wires 21 of the individual channels included in the cable bundle 20, and are connected respectively to the individual metal wires. For the plurality of terminals 12*a*-12*p*, a pair of terminals is configured by two terminals, and a pair of terminals 12*e* and 12*f*, a pair of terminals 12*g* and 12*h*, a pair of terminals 12*i* and 12*j*, and a pair of terminals 12*k* and 12*l* are signal terminals for transmission. A pair of terminals 12*a* and 12*b*, a pair of terminals 12*c* and 12*d*, a pair of terminals 12*m* and 12*n*, and a pair of terminals 12*o* and 12*p* are signal terminals for reception. In FIGS. 3A and 3B, terminals other than the terminals 12*a*-12*p* that are the signal terminals, a power supply terminal and a ground terminal or the like for example, are omitted.

On one surface 13*a*, a pair of the terminals 12*c* and 12*d* and a pair of the terminals 12*e* and 12*f* are arranged so as to be between a pair of the terminals 12*a* and 12*b* and a pair of the terminals 12*g* and 12*h*, and more specifically, a pair of the terminals 12*c* and 12*d* is arranged at a position near a pair of the terminals 12*a* and 12*b* between a pair of the terminals 12*a* and 12*b* and a pair of the terminals 12*g* and 12*h*, and a pair of the terminals 12*e* and 12*f* is arranged at a position near a pair of the terminals 12*g* and 12*h* between a pair of the terminals 12*a* and 12*b* and a pair of the terminals 12*g* and 12*h*. That is, a pair of the terminals 12*a* and 12*b* is adjacent to a pair of the terminals 12*c* and 12*d*, a pair of the terminals 12*c* and 12*d* is adjacent to a pair of the terminals 12*a* and 12*b* and a pair of the terminals 12*e* and 12*f*, a pair of the terminals 12*e* and 12*f* is adjacent to a pair of the terminals 12*c* and 12*d* and a pair of the terminals 12*g* and 12*h*, and a pair of the terminals 12*g* and 12*h* is adjacent to a pair of the terminals 12*e* and 12*f*.

On the other surface 13*b*, a pair of the terminals 12*k* and 12*l* and a pair of the terminals 12*m* and 12*n* are arranged so as to be between a pair of the terminals 12*i* and 12*j* and a pair of the terminals 12*o* and 12*p*, and more specifically, a pair of the terminals 12*k* and 12*l* is arranged at a position near a pair of the terminals 12*i* and 12*j* between a pair of the terminals 12*i* and 12*j* and a pair of the terminals 12*o* and 12*p*, and a pair of the terminals 12*m* and 12*n* is arranged at a position near a pair of the terminals 12*o* and 12*p* between a pair of the terminals 12*i* and 12*j* and a pair of the terminals 12*o* and 12*p*. That is, a pair of the terminals 12*i* and 12*j* is adjacent to a pair of the terminals 12*k* and 12*l*, a pair of the terminals 12*k* and 12*l* is adjacent to a pair of the terminals 12*i* and 12*j* and a pair of the terminals 12*m* and 12*n*, a pair of the terminals 12*m* and 12*n* is adjacent to a pair of the terminals 12*k* and 12*l* and a pair of the terminals 12*o* and 12*p*, and a pair of the terminals 12*o* and 12*p* is adjacent to a pair of the terminals 12*m* and 12*n*.

The pad group 15 includes a pad group 15A provided on one surface 13*a* of the substrate 13 and a pad group 15B provided on the other surface 13*b* of the substrate 13. Each of the pad groups 15A and 15B has four pads 15*a* for transmission and four pads 15*b* for reception. To the pad 15*a*, one end of a core wire 21*a* of the metal wires 26-29 which are the metal wires 21 for the transmission and configure the mutually different signal transmission lines is conductively bonded. Further, to the pad 15*b*, one end of a core wire 21*a* of the metal wires 22-25 which are the metal wires 21 for the reception and configure the mutually different signal transmission lines is conductively bonded.

The pad 15*a* to which a pair of metal wires 26*a* and 26*b* configuring the metal wire 26 for the transmission is conductively bonded is electrically connected to a pair of the terminals 12*g* and 12*h* through wiring 16. The pad 15*a* to which a pair of metal wires 28*a* and 28*b* configuring the metal wire 28 for the transmission is conductively bonded is electrically connected to a pair of the terminals 12*e* and 12*f* through the wiring 16. The pad 15*a* to which a pair of metal wires 27*a* and 27*b* configuring the metal wire 27 for the transmission is conductively bonded is electrically connected to a pair of the terminals 12*i* and 12*j* through the wiring 16. The pad 15*a* to which a pair of metal wires 29*a* and 29*b* configuring the metal wire 29 for the transmission is conductively bonded is electrically connected to a pair of the terminals 12*k* and 12*l* through the wiring 16.

The pad 15*b* to which a pair of metal wires 25*a* and 25*b* configuring the metal wire 25 for the reception is conductively bonded is electrically connected to a pair of the terminals 12*c* and 12*d* through the wiring 16. The pad 15*b* to which a pair of metal wires 23*a* and 23*b* configuring the metal wire 23 for the reception is conductively bonded is electrically connected to a pair of the terminals 12*a* and 12*b* through the wiring 16. The pad 15*b* to which a pair of metal wires 24*a* and 24*b* configuring the metal wire 24 for the reception is conductively bonded is electrically connected to a pair of the terminals 12*m* and 12*n* through the wiring 16. The pad 15*b* to which a pair of metal wires 22*a* and 22*b* configuring the metal wire 22 for the reception is conductively bonded is electrically connected to a pair of the terminals 12*o* and 12*p* through the wiring 16.

Thus, at the connection part 12 on one surface 13*a*, a pair of the metal wires 26*a* and 26*b* electrically connected to a pair of the terminals 12*g* and 12*h* and a pair of the metal wires 28*a* and 28*b* electrically connected to a pair of the terminals 12*e* and 12*f* are adjacently connected. A pair of the metal wires 28*a* and 28*b* electrically connected to a pair of the terminals 12*e* and 12*f* and a pair of the metal wires 25*a* and 25*b* electrically connected to a pair of the terminals 12*c* and 12*d* are adjacently connected. A pair of the metal wires 25*a* and 25*b* electrically connected to a pair of the terminals 12*c* and 12*d* and a pair of the metal wires 23*a* and 23*b* electrically connected to a pair of the terminals 12*a* and 12*b* are adjacently connected.

Further, at the connection part 12 on the other surface 13*b*, a pair of the metal wires 27*a* and 27*b* electrically connected to a pair of the terminals 12*i* and 12*j* and a pair of the metal wires 29*a* and 29*b* electrically connected to a pair of the terminals 12*k* and 12*l* are adjacently connected. A pair of the metal wires 29*a* and 29*b* electrically connected to a pair of the terminals 12*k* and 12*l* and a pair of the metal wires 24*a* and 24*b* electrically connected to a pair of the terminals 12*m* and 12*n* are adjacently connected. A pair of the metal wires 24*a* and 24*b* electrically connected to a pair of the terminals 12*m*and 12*n* and a pair of the metal wires 22*a* and 22*b* electrically connected to a pair of the terminals 12*o* and 12*p* are adjacently connected.

Figure 4:
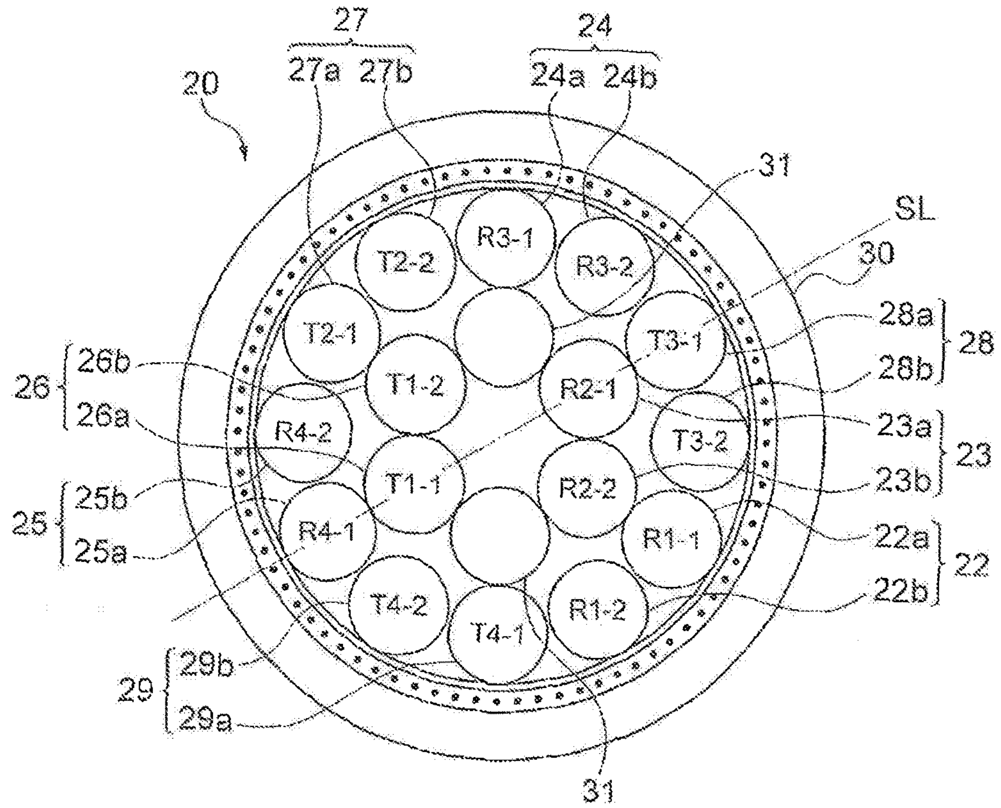
FIG. 4 is a schematic diagram illustrating a configuration viewed from an extending direction at one end of a cable.

FIG. 4 is a schematic diagram illustrating a configuration viewed from an extending direction at one end of the cable bundle 20. The cable bundle 20 includes the plurality of metal wires 22-29 that transmit signals, and a coating part 30 that covers the metal wires 22-29. The coating part 30 has a jacket configured by an insulator such as polyvinyl chloride, polyester, urethane or rubber, and a braided wire (external conductor) that is interposed between the jacket and the metal wires 22-29 and covers the metal wires 22-29.

The cable bundle 20 includes, as the metal wires 21, the outer metal wires arranged along the periphery of the cable bundle 20, and the inner metal wires arranged on the inner of the outer metal wires. Specifically, the metal wires 22, 24, 25, 27, 28 and 29 are the outer metal wires arranged along the periphery of the cable bundle 20, and the metal wires 23 and 26 are the inner metal wires arranged on the inner of the outer metal wires. In the cable bundle 20, inclusions 31 are arranged so as to be adjacent to the inner metal wires on the inner of the outer metal wires.

In the cable bundle 20, the metal wires that are adjacently connected at the connection part 12 of the substrate 13 described above and configure the mutually different signal transmission lines are arranged so as not to be adjacent to each other inside the cable bundle 20. Since the metal wires configure the individual signal transmission line by a pair (two wires), the fact that the metal wires of the different signal transmission lines are not adjacent to each other inside the cable bundle 20 means that both of the two wires of a pair are not adjacent to each other. That is, the fact that a first metal wire and a second metal wire are not adjacent to each other means that both of a pair (two) of the metal wires which are the first metal wires are not adjacent to either of a pair (two) of the metal wires which are the second metal wires.

Description will be given specifically with reference to FIGS. 3A, 3B and FIG. 4. For example, the metal wires 26 (metal wires 26*a* and 26*b*) and the metal wires 28 (metal wires 28*a* and 28*b*) are adjacently connected at the connection part 12. On the other hand, inside the cable bundle 20, the inclusion 31 and the metal wires 23 (R2-1 and R2-2 illustrated in FIG. 4) are arranged between the metal wires 26 (T1-1 and T1-2 illustrated in FIG. 4) and the metal wires 28 (T3-1 and T3-2 illustrated in FIG. 4), and the metal wires 26 and the metal wires 28 are not arranged adjacently to each other. Similarly, the metal wires 28 (metal wires 28*a* and 28*b*) and the metal wires 25 (metal wires 25*a* and 25*b*) adjacently connected at the connection part 12 are not arranged adjacently to each other inside the cable bundle 20 (see the metal wires 28 (T3-1 and T3-2) and the metal wires 25 (R4-1 and R4-2) in FIG. 4). Similarly, the metal wires 25 (metal wires 25*a* and 25*b*) and the metal wires 23 (metal wires 23*a* and 23*b*) adjacently connected at the connection part 12 are not arranged adjacently to each other inside the cable bundle 20 (see the metal wires 25 (R4-1 and R4-2) and the metal wires 23 (R2-1 and R2-2) in FIG. 4). Similarly, the metal wires 27 (metal wires 27*a* and 27*b*) and the metal wires 29 (metal wires 29*a* and 29*b*) adjacently connected at the connection part 12 are not arranged adjacently to each other inside the cable bundle 20 (see the metal wires 27 (T2-1 and T2-2) and the metal wires 29 (T4-1 and T4-2) in FIG. 4). Similarly, the metal wires 29 (metal wires 29*a* and 29*b*) and the metal wires 24 (metal wires 24*a* and 24*b*) adjacently connected at the connection part 12 are not arranged adjacently to each other inside the cable bundle 20 (see the metal wires 29 (T4-1 and T4-2) and the metal wires 24 (R3-1 and R3-2) in FIG. 4). Similarly, the metal wires 24 (metal wires 24*a* and 24*b*) and the metal wires 22 (metal wires 22*a* and 22*b*) adjacently connected at the connection part 12 are not arranged adjacently to each other inside the cable bundle 20 (see the metal wires 24 (R3-1 and R3-2) and the metal wires 22 (R1-1 and R1-2) in FIG. 4).

Further, in the cable bundle 20, part of the combinations of the metal wires that are adjacently connected at the connection part 12 of the substrate 13 and configure the mutually different signal transmission lines is the combination of the outer metal wires with each other, and the metal wires 21 relating to the combination are arranged on the same straight line SL passing through the center of the cable bundle 20 in the cross section of the cable bundle 20 perpendicular to the axis of the cable bundle 20. For example, the combination of the metal wires 28 and the metal wires 25 that are adjacently connected at the connection part 12 and configure the mutually different signal transmission lines is the combination of the outer metal wires with each other, and the metal wires 28 and 25 relating to the combination are arranged on the same straight line SL passing through the center of the cable bundle 20 in the cross section of the cable bundle 20 perpendicular to the axis of the cable bundle 20.

As described above, since the arrangement of the metal wires 21 inside the cable bundle 20 and the arrangement of the metal wires 21 at the connection part 12 are different, the terminal part 10 may have an aligning mold 70 (see FIGS. 3A and 3B) that converts the arrangement of the metal wires inside the cable bundle 20 to the arrangement of the metal wires 21 on the substrate 13 (at the connection part 12 more specifically). The aligning mold 70 is in a roughly cubic shape molded with plastic or polycarbonate or the like as a material, and is arranged on the side of the cable bundle 20 (on the opposite side of the connection part 12) to the pad group 15. On the aligning mold 70, an opening of the absolute minimum size that the metal wire 21 can pass through is formed. Or, the metal wires 21 are fixed by the aligning mold 70. By the metal wires 21 passing through the opening or being fixed by the mold after being aligned, the metal wires 21 are aligned and the metal wires 21 are easily connected at the connection part 12.

Effects obtained by the signal transmission cable 1 of the present embodiment including the above configuration will be described.

Generally, the line (wiring pattern) of the terminals on the substrate of the terminal part is determined by a standard. From that, the metal wires inside the cable are generally arranged based on the line of the terminals on the substrate in consideration of the mountability to the substrate.

Figure 5A:
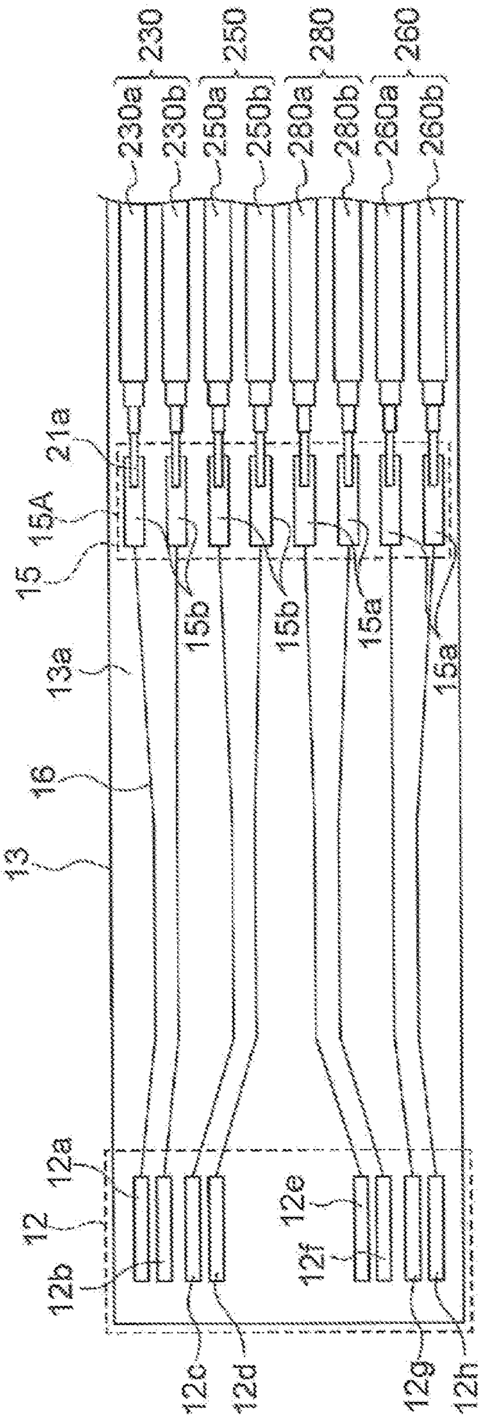
FIG. 5A is a top view viewing a substrate relating to a comparative example from one plate surface side.
Figure 5B:
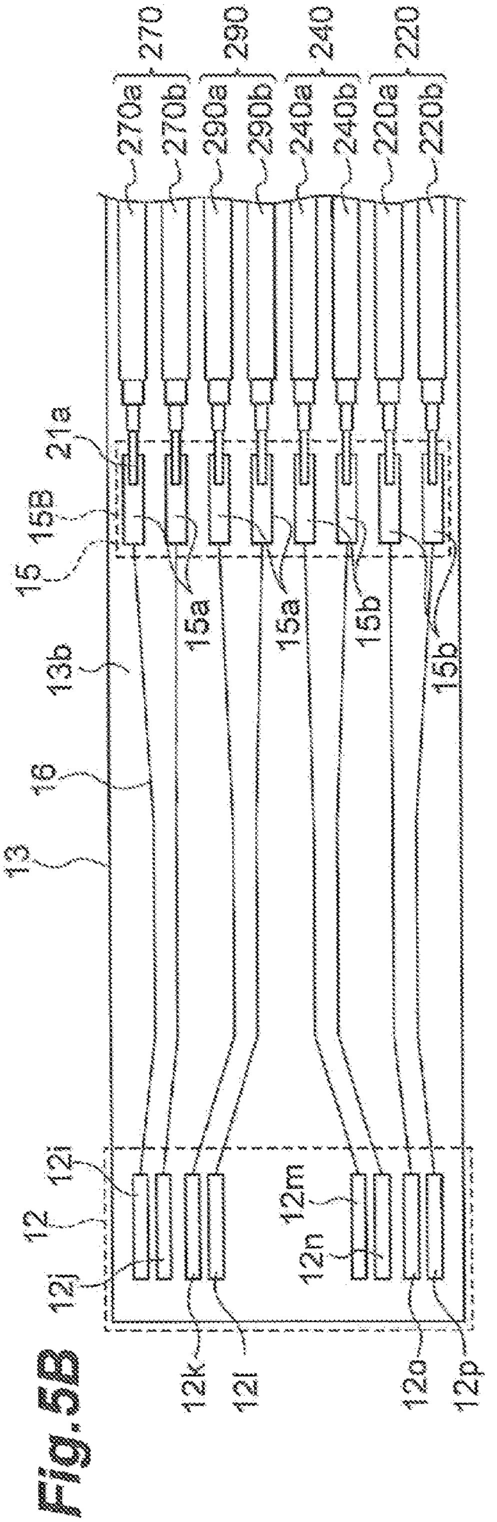
FIG. 5B is a rear view viewing the substrate relating to the comparative example from the other plate surface side.
Figure 6:
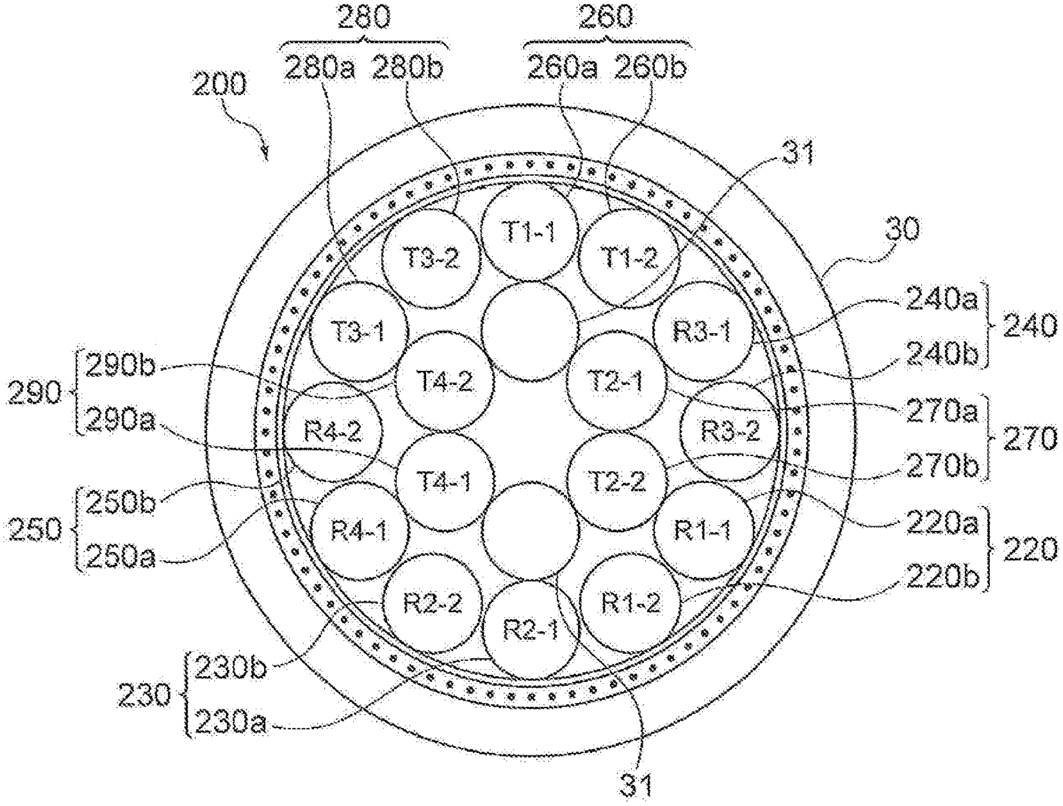
FIG. 6 is a schematic diagram illustrating one end of a cable relating to the comparative example.

Here, FIG. 5A is a top view viewing the substrate relating to a comparative example from one plate surface side. FIG. 5B is a rear view viewing the substrate relating to the comparative example from the other plate surface side. FIG. 6 is a schematic diagram illustrating one end of the cable relating to the comparative example. In the comparative example, the pad 15*a* to which a pair of metal wires 260*a* and 260*b* configuring a metal wire 260 for the transmission are conductively bonded is electrically connected to a pair of the terminals 12*g* and 12*h* through the wiring 16. The pad 15*a* to which a pair of metal wires 280*a* and 280*b* configuring a metal wire 280 for the transmission are conductively bonded is electrically connected to a pair of the terminals 12*e* and 12*f* through the wiring 16. The pad 15*a* to which a pair of metal wires 270*a* and 270*b* configuring a metal wire 270 for the transmission are conductively bonded is electrically connected to a pair of the terminals 12*i* and 12*j* through the wiring 16. The pad 15*a* to which a pair of metal wires 290*a* and 290*b* configuring a metal wire 290 for the transmission are conductively bonded is electrically connected to a pair of the terminals 12*k* and 12*l* through the wiring 16.

Further, in the comparative example, the pad 15*b* to which a pair of metal wires 250*a* and 250*b* configuring a metal wire 250 for the reception are conductively bonded is electrically connected to a pair of the terminals 12*c* and 12*d* through the wiring 16. The pad 15*b* to which a pair of metal wires 230*a* and 230*b* configuring a metal wire 230 for the reception are conductively bonded is electrically connected to a pair of the terminals 12*a* and 12*b* through the wiring 16. The pad 15*b* to which a pair of metal wires 240*a* and 240*b* configuring a metal wire 240 for the reception are conductively bonded is electrically connected to a pair of the terminals 12*m* and 12*n* through the wiring 16. The pad 15*b* to which a pair of metal wires 220*a* and 220*b* configuring a metal wire 220 for the reception are conductively bonded is electrically connected to a pair of the terminals 12*o* and 12*p* through the wiring 16.

For example, in the comparative example, the metal wire 260 for the transmission and the metal wire 280 for the transmission adjacently connected at the connection part 12 are also arranged adjacently to each other inside a cable bundle 200 (see the metal wire 260*a* (T1-1) and the metal wire 280*b* (T3-2) in FIG. 6). In the case that the metal wires that transmit signals in the same direction are adjacent both inside the cable and at the connection part in this way, the Far End Crosstalk (FEXT) which occurs between the signals in the same direction becomes particularly remarkable. Further, the metal wire 280 for the transmission and the metal wire 250 for the reception adjacently connected at the connection part 12 are also arranged adjacently to each other inside the cable bundle 200 (see the metal wire 280*a* (T3-1) and the metal wire 250*b* (R4-2) in FIG. 6). In the case that the metal wires that transmit signals in the different directions are adjacent both inside the cable and at the connection part in this way, Near End Crosstalk (NEXT) which occurs between transmission signals and reception signals becomes particularly remarkable. From the above, when the metal wires configuring the different signal transmission lines are adjacent both at the connection part and inside the cable, the influence of the crosstalk becomes remarkable.

In this respect, in the signal transmission cable 1 relating to the present embodiment, the metal wires 21 that are adjacently connected at the connection part 12 and configure the different signal transmission lines are arranged so as not to be adjacent (that is, through the other metal wire 21) inside the cable bundle 20 (see FIGS. 3A and 3B and FIG. 4). Thus, the metal wires 21 configuring the different signal transmission lines are prevented from being adjacent both at the connection part 12 and inside the cable bundle 20. Therefore, compared to the above-described comparative example, the influence of the crosstalk between the different channels can be reduced.

Further, the cable bundle 20 includes, as the metal wires 21, the outer metal wires arranged along the periphery of the cable bundle 20, and the inner metal wires arranged on the inner of the outer metal wires, and part of the combinations of the metal wires 21 of the mutually different channels that are adjacently connected at the plurality of connection parts 12 is the combination of the outer metal wires with each other, and the metal wires 21 relating to the combination are arranged on the same straight line SL passing through the center of the cable bundle 20 in the cross section of the cable bundle 20 perpendicular to the axis of the cable bundle 20. Thus, the metal wires that are adjacently connected at the connection part 12 and configure the different signal transmission lines can be arranged in a more separated positional relation in the cable bundle 20, and the influence of the crosstalk can be more effectively reduced. It is preferable that the combination is the combination of the metal wire 21 for the transmission and the metal wire 21 for the reception. Thus, the NEXT can be effectively reduced.

Further, since the terminal part 10 includes the aligning mold 70 that converts the arrangement of the metal wires 21 inside the cable bundle 20 to the arrangement of the metal wires 21 on the substrate 13, the arrangement of the metal wires 21 differently arranged inside the cable bundle 20 and at the connection part 12 can be appropriately converted, and the mountability is improved.

Second Embodiment

Figure 7A:
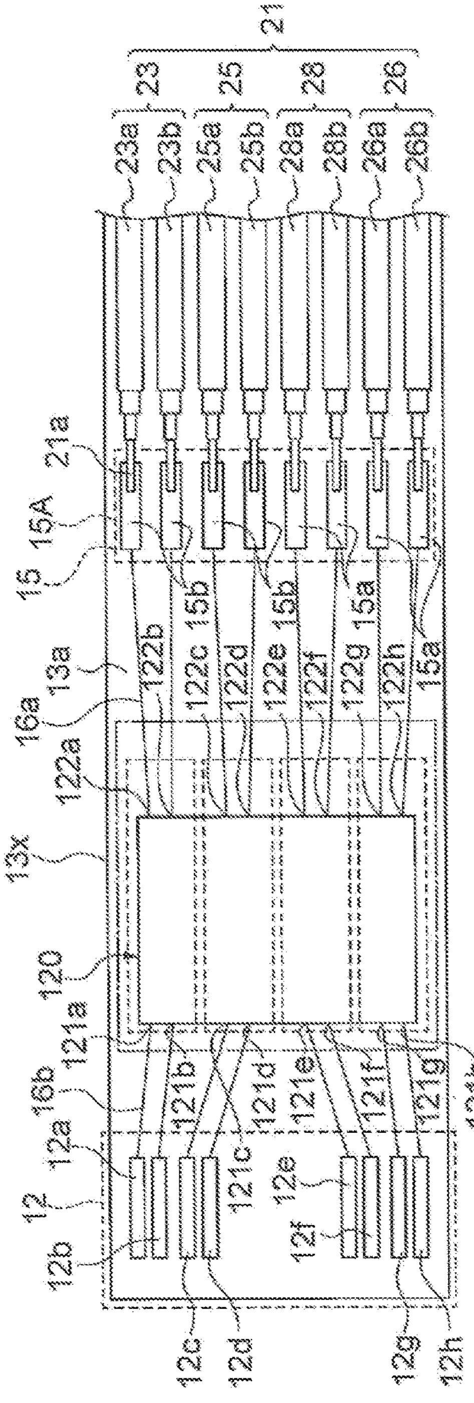
FIG. 7A is a top view viewing a substrate relating to a second embodiment from one plate surface side.
Figure 7B:
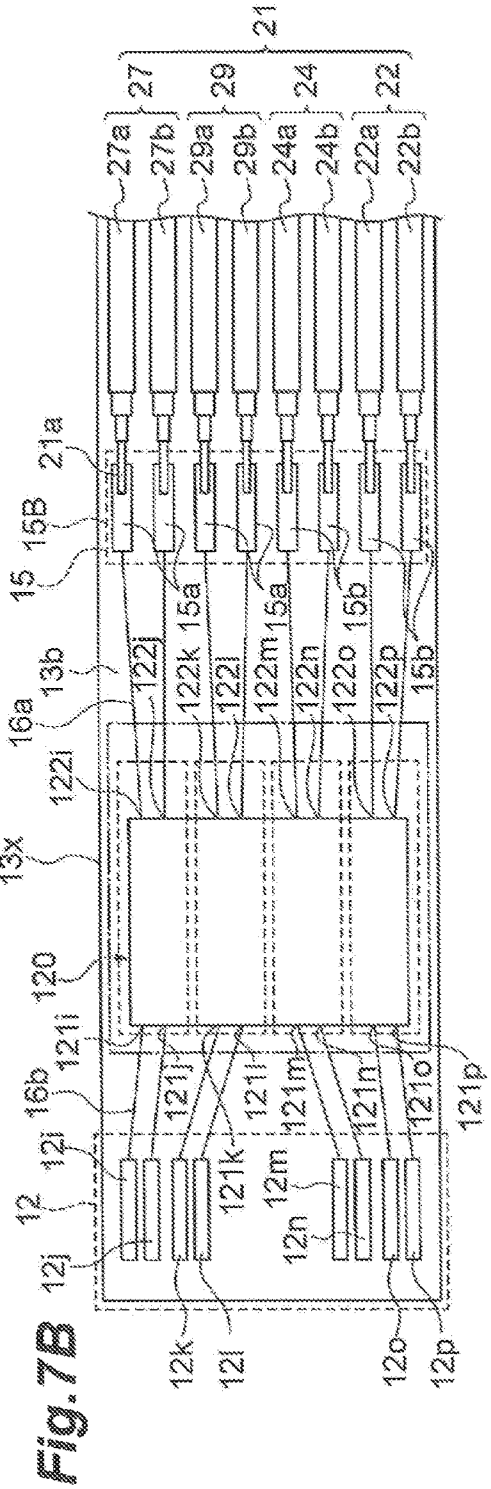
FIG. 7B is a rear view viewing the substrate relating to the second embodiment from the other plate surface side.

FIG. 7A is a top view viewing a substrate 13*x* relating to the second embodiment from one plate surface side. FIG. 7B is a rear view viewing the substrate 13*x* relating to the second embodiment from the other plate surface side. In the description of the second embodiment, the description in common with the first embodiment is omitted. It is similar in third-fifth embodiments described later. As illustrated in FIGS. 7A and 7B, the substrate 13*x* is similar to the above-described substrate 13 in that it has the connection part 12 and the pad group 15, but is different in that it is mounted with a signal processing circuit 120. The signal processing circuit 120 includes a signal shaping circuit such as a clock data recovery (CDR) circuit or a repeater circuit, and the signal shaping circuit is configured by an integrated circuit element (IC). The signal processing circuit 120 is electrically connected with an internal circuit of the external device by inserting the terminal part to the external device. The signal processing circuit 120 has a plurality of first terminals 121*a*-121*p* connected respectively to the plurality of terminals 12*a*-12*p* through wiring 16*b*, and second terminals 122*a*-122*p* connected respectively to the metal wires 22-29 of the individual channels through wiring 16*a*.

In more detail, the pad 15*a* to which a pair of the metal wires 26*a* and 26*b* configuring the metal wire 26 for the transmission is conductively bonded is electrically connected to a pair of the terminals 12*g* and 12*h* through the wiring 16*a*, second terminals 122*g* and 122*h* and first terminals 121*g* and 121*h* of the signal processing circuit 120 and the wiring 16*b*. The pad 15*a* to which a pair of the metal wires 28*a* and 28*b* configuring the metal wire 28 for the transmission is conductively bonded is electrically connected to a pair of the terminals 12*e* and 12*f* through the wiring 16*a*, second terminals 122*e* and 122*f* and first terminals 121*e* and 121*f* of the signal processing circuit 120 and the wiring 16*b*. The pad 15*a* to which a pair of the metal wires 27*a* and 27*b* configuring the metal wire 27 for the transmission is conductively bonded is electrically connected to a pair of the terminals 12*i* and 12*j* through the wiring 16*a*, second terminals 122*i* and 122*j* and first terminals 121*i* and 121*j* of the signal processing circuit 120 and the wiring 16*b*. The pad 15*a* to which a pair of the metal wires 29*a* and 29*b* configuring the metal wire 29 for the transmission is conductively bonded is electrically connected to a pair of the terminals 12*k* and 12*l* through the wiring 16*a*, second terminals 122*k* and 122*l* and first terminals 121*k* and 121*l* of the signal processing circuit 120 and the wiring 16*b*.

The pad 15*b* to which a pair of the metal wires 25*a* and 25*b* configuring the metal wire 25 for the reception is conductively bonded is electrically connected to a pair of the terminals 12*c* and 12*d* through the wiring 16*a*, the second terminals 122*c* and 122*d* and first terminals 121*c* and 121*d* of the signal processing circuit 120 and the wiring 16*b*. The pad 15*b* to which a pair of the metal wires 23*a* and 23*b* configuring the metal wire 23 for the reception is conductively bonded is electrically connected to a pair of the terminals 12*a* and 12*b* through the wiring 16*a*, second terminals 122*a* and 122*b* and first terminals 121*a* and 121*b* of the signal processing circuit 120 and the wiring 16*b*. The pad 15*b* to which a pair of the metal wires 24*a* and 24*b* configuring the metal wire 24 for the reception is conductively bonded is electrically connected to a pair of the terminals 12*m* and 12*n* through the wiring 16*a*, second terminals 122*m* and 122*n* and first terminals 121*m* and 121*n* of the signal processing circuit 120 and the wiring 16*b*. The pad 15*b* to which a pair of the metal wires 22*a* and 22*b* configuring the metal wire 22 for the reception is conductively bonded is electrically connected to a pair of the terminals 12*o* and 12*p* through the wiring 16*a*, second terminals 122*o* and 122*p* and first terminals 121*o* and 121*p* of the signal processing circuit 120 and the wiring 16*b*.

The arrangement of the metal wires 21 of the cable bundle 20 in the present embodiment is like FIG. 4 similarly to the first embodiment, and the metal wires that are adjacently connected at the second terminals 122*a*-122*p* and configure the mutually different signal transmission lines are arranged so as not to be adjacent to each other inside the cable bundle 20. Thus, similarly to the first embodiment, the influence of the crosstalk between the different channels can be reduced. Since the arrangement of the metal wires 21 in the cable bundle 20 is similar to the first embodiment, part of the combinations of the metal wires 21 adjacently connected at the second terminals 122*a*-122*p* is the combination of the outer metal wires with each other, and the metal wires 21 relating to the combination are arranged on the same straight line passing through the center of the cable bundle 20 in the cross section of the cable bundle 20 perpendicular to the axis of the cable bundle 20. Thus, the influence of the crosstalk can be reduced more.

Third Embodiment

Figure 8:
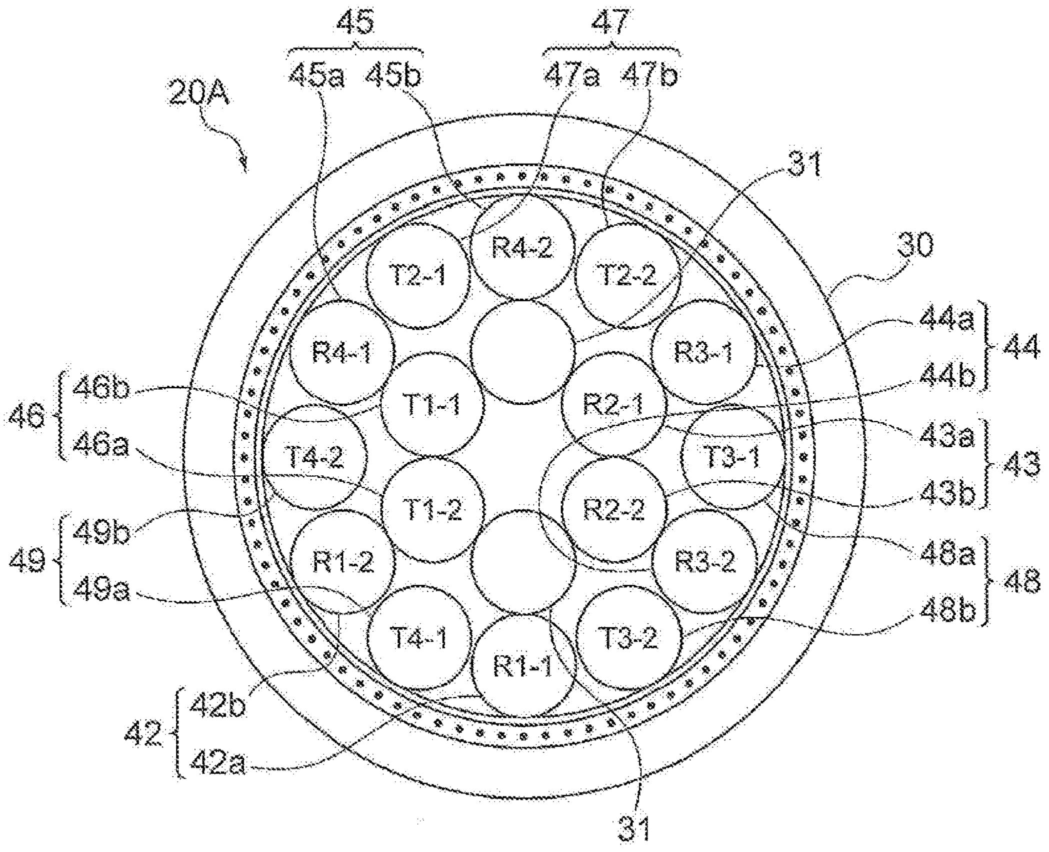
FIG. 8 is a schematic diagram illustrating one end of a cable relating to a third embodiment.

FIG. 8 is a schematic diagram illustrating one end of a cable bundle 20A relating to the third embodiment. As illustrated in FIG. 8, the cable bundle 20A has, as the outer metal wires arranged along the periphery of the cable bundle 20A, metal wires 47*a* and 47*b* (T2-1 and T2-2 in FIG. 8), metal wires 48*a* and 48*b* (T3-1 and T3-2 in FIG. 8) and metal wires 49*a* and 49*b* (T4-1 and T4-2 in FIG. 8) which are the metal wires for the transmission. The cable bundle 20A has, as the outer metal wires arranged along the periphery of the cable bundle 20A, metal wires 42*a* and 42*b* (R1-1 and R1-2 in FIG. 8), metal wires 44*a* and 44*b* (R3-1 and R3-2 in FIG. 8) and metal wires 45*a* and 45*b* (R4-1 and R4-2 in FIG. 8) which are the metal wires for the reception. The cable bundle 20A has, as the inner metal wires arranged on the inner of the outer metal wires, metal wires 46*a* and 46*b* (T1-1 and T1-2 in FIG. 8) which are the metal wires for the transmission, and metal wires 43*a* and 43*b* (R2-1 and R2-2 in FIG. 8) which are the metal wires for the reception.

In the cable bundle 20A, the metal wires that are the outer metal wires and transmit signals in the same direction are arranged so as not to be adjacent to each other on the periphery of the cable bundle 20A. Specifically, on the periphery of the cable bundle 20A, the metal wires of a differential pair configuring the same signal transmission line are not adjacent. Then, between the metal wires of the differential pair, the metal wire that transmits signals in the direction opposite to the metal wires of the differential pair is arranged. For example, between the metal wires 42*a* and 42*b* which are the differential pair that are arranged along the periphery of the cable bundle 20A and configure the signal transmission line for the reception, the metal wire 49*a* which is the metal wire for the transmission is arranged. In this way, in the cable bundle 20A, on the periphery of the cable bundle 20A, the metal wires that transmit signals in the same direction are arranged so as not to be adjacent to each other.

The FEXT to be a problem between the signal transmission lines that transmit signals in the same direction becomes a problem particularly in the case that the metal wires configuring the signal transmission lines are adjacent near the periphery of the cable. Thus, in the cable bundle 20A, since the metal wires 21 that transmit signals in the same direction are not adjacent to each other on the periphery of the cable bundle 20A, the influence of the FEXT can be reduced.

Fourth Embodiment

Figure 9A:
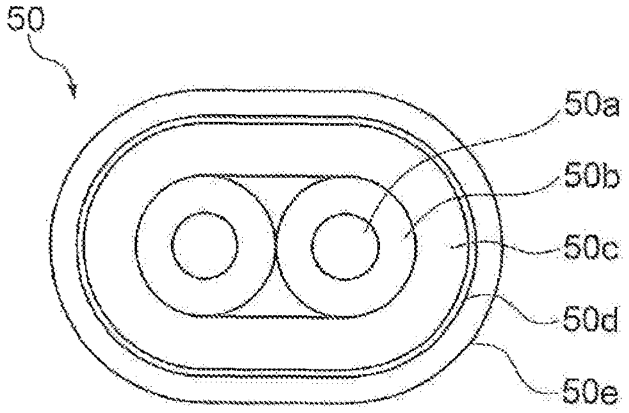
FIG. 9A is a schematic diagram illustrating a metal wire included in a cable relating to a fourth embodiment.
Figure 9B:
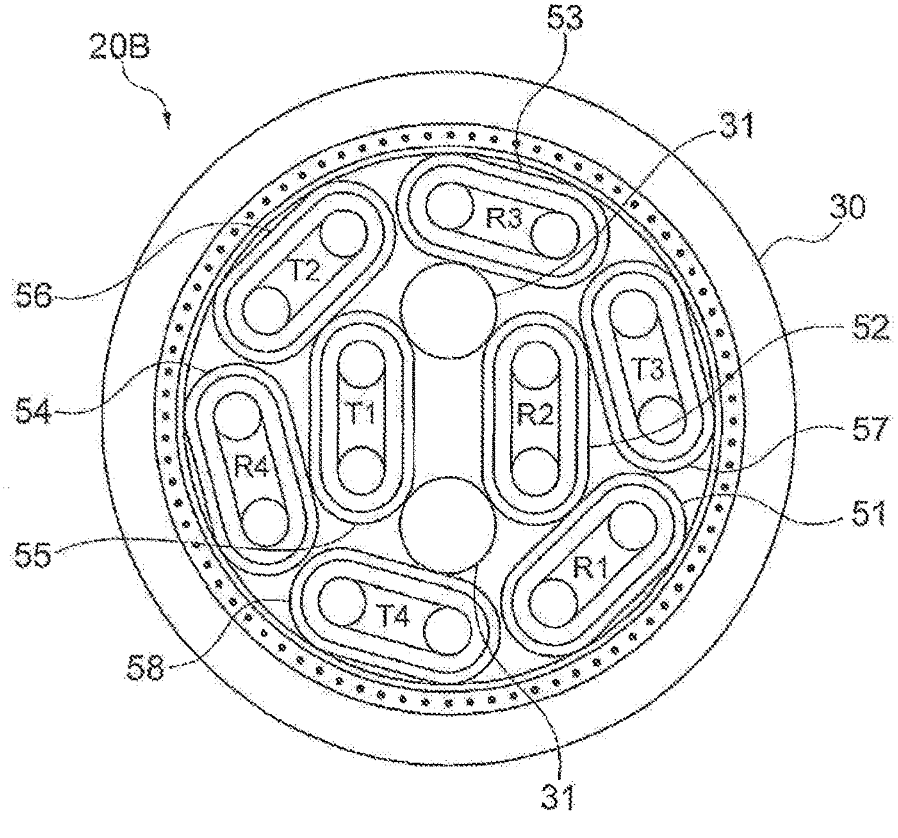
FIG. 9B is a schematic diagram illustrating one end of the cable relating to the fourth embodiment.

FIG. 9A is a schematic diagram illustrating one cable core 50 (metal wire) included in a cable bundle 20B, and FIG. 9B is a schematic diagram illustrating one end of the entire cable bundle 20B. As illustrated in FIG. 9A, the cable core 50 is a twin-ax cable. One cable core 50 included in the cable bundle 20B has a pair of conductors 50*a* arranged in parallel. Then, on respective outer peripheral surfaces of the pair of conductors 50*a*, a pair of coating layers 50*b* is provided respectively by extrusion molding. The coating layer 50*b* is configured by a foamed insulating resin or the like. Then, shields 50*c* and 50*d* surround the periphery of the coating layers 50*b*, and a jacket 50*e* surrounds the periphery further.

The cable bundle 20B has cable cores 51-58 as the cable cores 50. The cable cores 51-54 are the metal wires for the reception, and the cable cores 55-58 are the metal wires for the transmission. In the present embodiment as well, the metal wires (cable cores 51-58) of the different channels that are adjacently connected at the connection part of the substrate are arranged so as not to be adjacent to each other inside the cable bundle 20B. That is, for example, in the case that the cable core 51 is adjacent to the cable core 53 at the connection part of the substrate, as illustrated in FIG. 9B, the cable core 51 (R1 in FIG. 9B) and the cable core 53 (R3 in FIG. 9B) are arranged so as not to be adjacent. By such an arrangement, even in the case of using the twin-ax cable as the cable bundle, similarly to the first embodiment, the influence of the crosstalk between the different channels can be reduced.

Fifth Embodiment

Figure 10A:
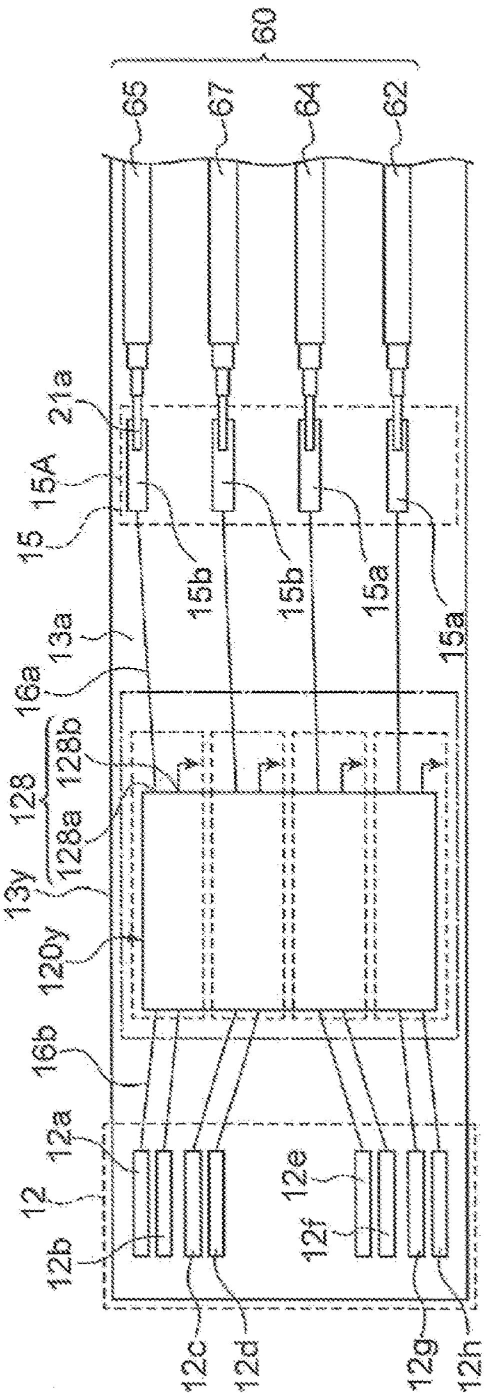
FIG. 10A is a top view viewing a substrate relating to a fifth embodiment from one plate surface side.
Figure 10B:
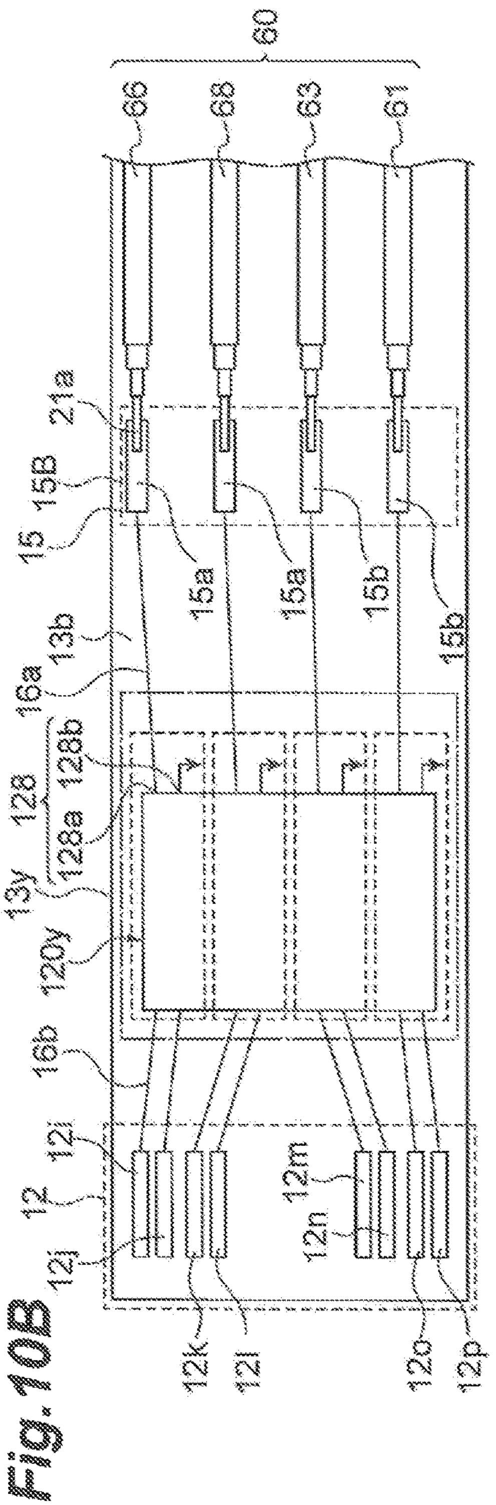
FIG. 10B is a rear view viewing the substrate relating to the fifth embodiment from the other plate surface side.
Figure 11A:
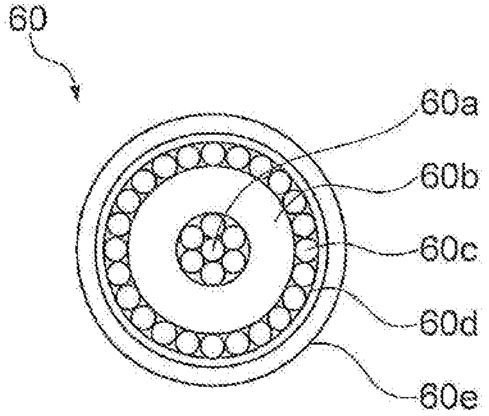
FIG. 11A is a schematic diagram illustrating a metal wire included in a cable relating to a fifth embodiment.
Figure 11B:
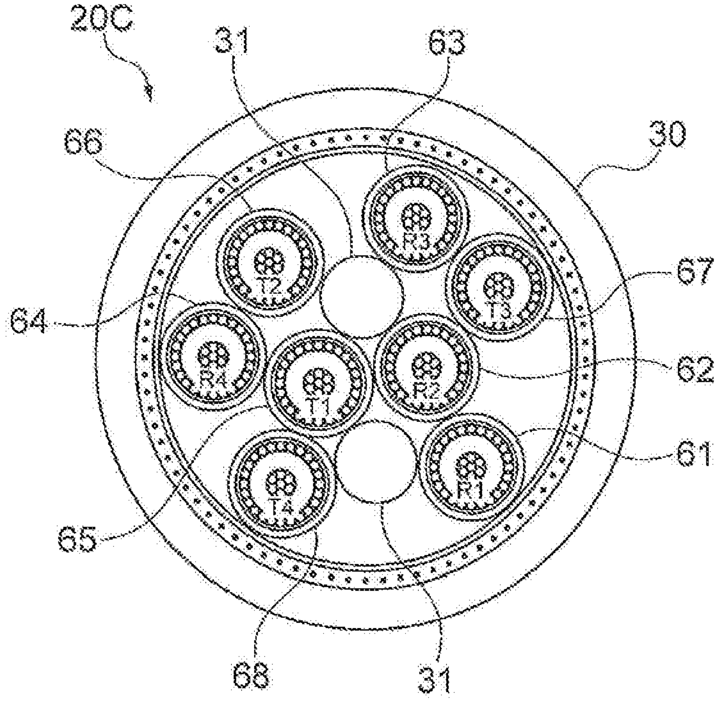
FIG. 11B is a schematic diagram illustrating one end of the cable relating to the fifth embodiment.

FIG. 10A is a top view viewing a substrate 13*y* relating to the fifth embodiment from one plate surface side, and FIG. 10B is a rear view viewing the substrate 13*y* relating to the fifth embodiment from the other plate surface side. FIG. 11A is a schematic diagram illustrating one metal wire included in a cable bundle 20C, and FIG. 11B is a schematic diagram illustrating one end of the entire cable bundle 20C. As illustrated in FIG. 11B, the cable bundle 20C is a coaxial cable for single end input. A metal wire 60 included in the cable bundle 20C is the metal wire that transfers data by one signal line, and includes an internal conductor 60*a*, an insulator 60*b* provided on an outer peripheral surface of the internal conductor 60*a*, external conductors 60*c* and 60*d* surrounding the periphery of the insulator 60*b*, and a jacket 60*e* surrounding the periphery of the external conductor 60*d*. The cable bundle 20C has metal wires 61-68 as the metal wires 60.

As illustrated in FIGS. 10A and 10B, the substrate 13*y* is mounted with a signal processing circuit 120*y*. Similarly to the above-described signal processing circuit 120, the signal processing circuit 120*y* includes a signal shaping circuit such as a clock data recovery (CDR) circuit or a repeater circuit, and the signal shaping circuit is configured by an integrated circuit element (IC). The signal processing circuit 120*y* transmits or receives differential signals to/from the external device, and also transmits or receives single end signals to/from the metal wires 61-68. The signal processing circuit 120*y* has a pair of terminals 128 corresponding to each of the individual metal wires 61-68. At one terminal 128*a* of a pair of the terminals 128, one of the metal wires 61-68 is short-circuited in terms of AC and the single end signals are transmitted and received. On the other hand, the other terminal 128*b* is terminated.

In the above-described cable bundle 20C which is the coaxial cable for the single end input as well, the metal wires 61-68 of the mutually different channels that are adjacently connected at the terminal 128 (the terminal 128*a* more specifically) of the signal processing circuit 120*y* are arranged so as not to be adjacent to each other inside the cable bundle 20C. That is, for example, as illustrated in FIG. 10A, the metal wires 65 and 67 that are adjacently connected at the terminal 128 are arranged so as not to be adjacent to each other inside the cable bundle 20C as illustrated in FIG. 11B (see T1 and T3 in FIG. 11B). By such an arrangement, even in the case of using the coaxial cable for the single end input as the cable bundle, similarly to the first embodiment, the influence of the crosstalk between the different channels can be reduced. By using the coaxial cable for the single end input, the transmission signals and the reception signals can be transmitted by one wire so that transmission loss due to skew occurrence can be suppressed.

The embodiments of the present invention are described above, however, the present invention is not limited to the above-described embodiments. For example, the metal wires 21 configuring the signal transmission lines included in the cable bundle 20 are described as eight channels, however, without being limited thereto, the number of channels may be larger than eight channels. Further, as a configuration for converting the differential signals to the single end signals, a system of connecting one of differential output of the integrated circuit element to a terminating circuit is illustrated, however, as a system for converting the differential signals to the single end signals, various systems can be adopted without being limited thereto.

What is claimed is:

1. A signal transmission cable comprising:

a terminal part attachable to and detachable from an external device; and a cable fixed to the terminal part, wherein the cable includes eight or more metal wires constituting signal transmission lines, wherein the terminal part comprises a substrate that are electrically connectable to the external device, wherein the substrate includes a plurality of connection parts connected respectively to a core wire of the metal wires, wherein an even number of four or more connection parts of the plurality of connection parts are arranged in a first direction on one surface of the substrate and constitute a first connection part group, wherein the connection parts in the first connection part group are each successively arranged in pairs, wherein the eight or more metal wires are configured such that a first metal wire connected to a one of the connection parts in the first connection part group is arranged in the cable so as to be directly adjacent to a second metal wire that is not connected to an other of the connection parts constituting a one of the pairs positioned next to an other of the pairs constituted by the one of the connection parts to which the first metal wire is connected, wherein the eight or more metal wires are an even number, wherein the connection parts of the plurality of connection parts that are not in the first connection part group are arranged in the first direction on another surface of the substrate opposite to the one surface and constitute a second connection part group, wherein the connection parts in the second connection part group are each successively arranged in pairs, and wherein the eight or more metal wires are configured such that a third metal wire connected to a one of the connection parts in the second connection part group is arranged in the cable so as to be directly adjacent to a fourth metal wire that is not connected to an other of the connection parts constituting a one of the pairs positioned next to an other of the pairs constituted by the one of the connection parts to which the third metal wire is connected.

2. A signal transmission cable comprising:

a terminal part attachable to and detachable from an external device; and a cable fixed to the terminal part, wherein the cable includes eight or more metal wires constituting signal transmission lines, wherein the cable includes outer metal wires arranged along a periphery of the cable, and inner metal wires arranged on an inner of the outer metal wire, as the metal wires, wherein the terminal part comprises a substrate that are electrically connectable to the external device, wherein the substrate includes a plurality of connection parts connected respectively to a core wire of the metal wires, wherein an even number of four or more connection parts of the plurality of connection parts are arranged in a first direction on one surface of the substrate and constitute a first connection part group, wherein the connection parts in the first connection part group are each successively arranged in pairs, wherein the outer metal wires are configured such that a first metal wire connected to a one of the connection parts in the first connection part group is arranged so as to be next to a second metal wire in line with the outer metal wires in the cable, wherein the second metal wire is not connected to an other of the connection parts constituting a one of the pairs positioned next to an other of the pairs constituted by the one of the connection parts to which the first metal wire is connected, wherein the plurality of metal wires is even, wherein the connection parts of the plurality of connection parts that are not in the first connection part group are arranged in the first direction on another surface of the substrate opposite to the one surface and constitute a second connection part group, wherein the connection parts in the second connection part group are each successively arranged in pairs, wherein the outer metal wires are configured such that a third metal wire connected to a one of the connection parts in the second connection part group is arranged so as to be next to a forth metal wire in line with the outer metal wires in the cable, and wherein the forth metal wire is not connected to an other of the connection parts constituting a one of the pairs positioned next to an other of the pairs constituted by the one of the connection parts to which the third metal wire is connected.

3. A signal transmission cable comprising:

a terminal part attachable to and detachable from an external device; and a cable fixed to the terminal part, wherein the cable includes 4 or more metal wires constituting signal transmission lines, wherein the terminal part comprises a substrate that includes a plurality of external connection parts that are electrically connectable to the external device, a plurality of cable connection parts connected respectively to a core wire of the metal wires, one or more signal processing circuits having a plurality of first terminals connected respectively to the plurality of external connection parts, and a plurality of second terminals connected respectively to the plurality of cable connection parts, wherein the one or more signal processing circuits transmit or receive differential signals to/from the external device, and transmit or receive single end signals to/from the metal wires, wherein two or more cable connection parts of the plurality of cable connection parts are arranged in a first direction on one surface of the substrate and constitute a first connection part group, wherein the four or more metal wires are configured such that a first metal wire connected to a one of the cable connection parts in the first connection part group is arranged in the cable so as to be directly adjacent to a second metal wire that is connected to an other of the cable connection parts other than the cable connection parts positioned next to the one of the cable connection parts to which the first metal wire is connected in the first connection part group, wherein cable connection parts of the plurality of cable connection parts that are not in the first connection part group are arranged in the first direction on another surface of the substrate opposite to the one surface and constitute a second connection part group, and wherein the four or more metal wires are configured such that a third metal wire connected to a one of the cable connection parts in the second connection part group is arranged in the cable so as to be directly adjacent to a forth metal wire that is connected to an other of the cable connection parts other than the cable connection parts positioned next to the one of the cable connection parts to which the third metal wire is connected in the second connection part group.

* * * * *